US011081084B2

(12) United States Patent
Uchida et al.

(10) Patent No.: US 11,081,084 B2
(45) Date of Patent: Aug. 3, 2021

(54) ELECTRONIC APPARATUS, LUMINANCE CONTROL METHOD, AND STORAGE MEDIUM

(71) Applicant: CASIO COMPUTER CO., LTD., Tokyo (JP)

(72) Inventors: Shuhei Uchida, Hamura (JP); Keiichi Nomura, Uenohara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/957,076

(22) PCT Filed: Dec. 14, 2018

(86) PCT No.: PCT/JP2018/046176
§ 371 (c)(1),
(2) Date: Jun. 22, 2020

(87) PCT Pub. No.: WO2019/124272
PCT Pub. Date: Jun. 27, 2019

(65) Prior Publication Data
US 2020/0349904 A1    Nov. 5, 2020

(30) Foreign Application Priority Data

Dec. 21, 2017  (JP) .............................. JP2017-245306
Mar. 19, 2018  (JP) .............................. JP2018-051324

(51) Int. Cl.
*G09G 5/10*    (2006.01)
*G06F 3/041*   (2006.01)
(Continued)

(52) U.S. Cl.
CPC ............. *G09G 5/10* (2013.01); *G06F 3/0416* (2013.01); *G09G 3/3208* (2013.01); *G09G 2360/144* (2013.01)

(58) Field of Classification Search
USPC ......................................................... 345/690
See application file for complete search history.

(56) References Cited

U.S. PATENT DOCUMENTS

2006/0056178 A1* 3/2006 Len-Li .............. G02F 1/133609
                                                          362/231
2007/0222742 A1* 9/2007 Kimura ................ G09G 3/3611
                                                          345/102
(Continued)

FOREIGN PATENT DOCUMENTS

JP       2007079113 A     3/2007
JP       2007232882 A     9/2007
(Continued)

OTHER PUBLICATIONS

International Search Report (ISR) (and English translation thereof) dated Mar. 19, 2019 issued in International Application No. PCT/JP2018/046176.

(Continued)

*Primary Examiner* — Chineyere D Wills-Burns
(74) *Attorney, Agent, or Firm* — Holtz, Holtz & Volek PC

(57) ABSTRACT

Provided is an electronic apparatus in which an illuminance sensor is arranged on the back side of a display unit, and which can perform the appropriate luminance adjustment. The electronic apparatus includes a display unit, an illuminance sensor, a luminance control unit, and an operation judgement unit. The illuminance sensor is disposed on back side of the display surface of the display unit. The luminance control unit controls the luminance of the display unit based on the information related to light detected by the illuminance sensor. The operation judgement unit judges reliability of the information related to light detected by the illuminance sensor. The luminance control unit controls the luminance of the display unit when reliability is judged to be (Continued)

high. The luminance control unit suppresses control of the luminance of the display unit when reliability is judged to be low.

14 Claims, 7 Drawing Sheets

(51) Int. Cl.
  *G09G 3/3208* (2016.01)
  *G04R 20/02* (2013.01)
  *G04G 21/04* (2013.01)
  *G04G 9/00* (2006.01)
  *G04G 21/02* (2010.01)
  *G06F 1/16* (2006.01)
  *G06F 1/3234* (2019.01)

(56) References Cited

U.S. PATENT DOCUMENTS

| | | | | |
|---|---|---|---|---|
| 2010/0020029 A1* | 1/2010 | Park | ................. | G06F 3/0412 345/173 |
| 2012/0162110 A1* | 6/2012 | Kobayashi | ........... | G09G 3/3406 345/173 |
| 2013/0021455 A1* | 1/2013 | Sasazaki | ............. | H04N 13/363 348/51 |
| 2014/0132158 A1 | 5/2014 | Land et al. | | |
| 2014/0341589 A1* | 11/2014 | Schmid | ................ | H04B 10/116 398/131 |
| 2014/0362008 A1 | 12/2014 | Tanada | | |
| 2016/0078823 A1* | 3/2016 | Chang | ................... | G06F 1/3206 345/173 |
| 2016/0120421 A1* | 5/2016 | Matsuo | .............. | A61B 5/02055 600/476 |
| 2017/0045918 A1* | 2/2017 | Han | .................... | G02F 1/13318 |
| 2018/0174526 A1* | 6/2018 | Chesnokov | .......... | G06K 9/4652 |
| 2019/0164522 A1* | 5/2019 | Bonnier | .............. | G06F 3/03547 |

FOREIGN PATENT DOCUMENTS

| | | |
|---|---|---|
| JP | 2012137859 A | 7/2012 |
| JP | 2014238967 A | 12/2014 |
| JP | 2017003613 A | 1/2017 |

OTHER PUBLICATIONS

Written Opinion dated Mar. 19, 2019 issued in International Application No. PCT/JP2018/046176.
Japanese Office Action dated Feb. 4, 2020 issued in Japanese Application No. 2018-051324.

* cited by examiner

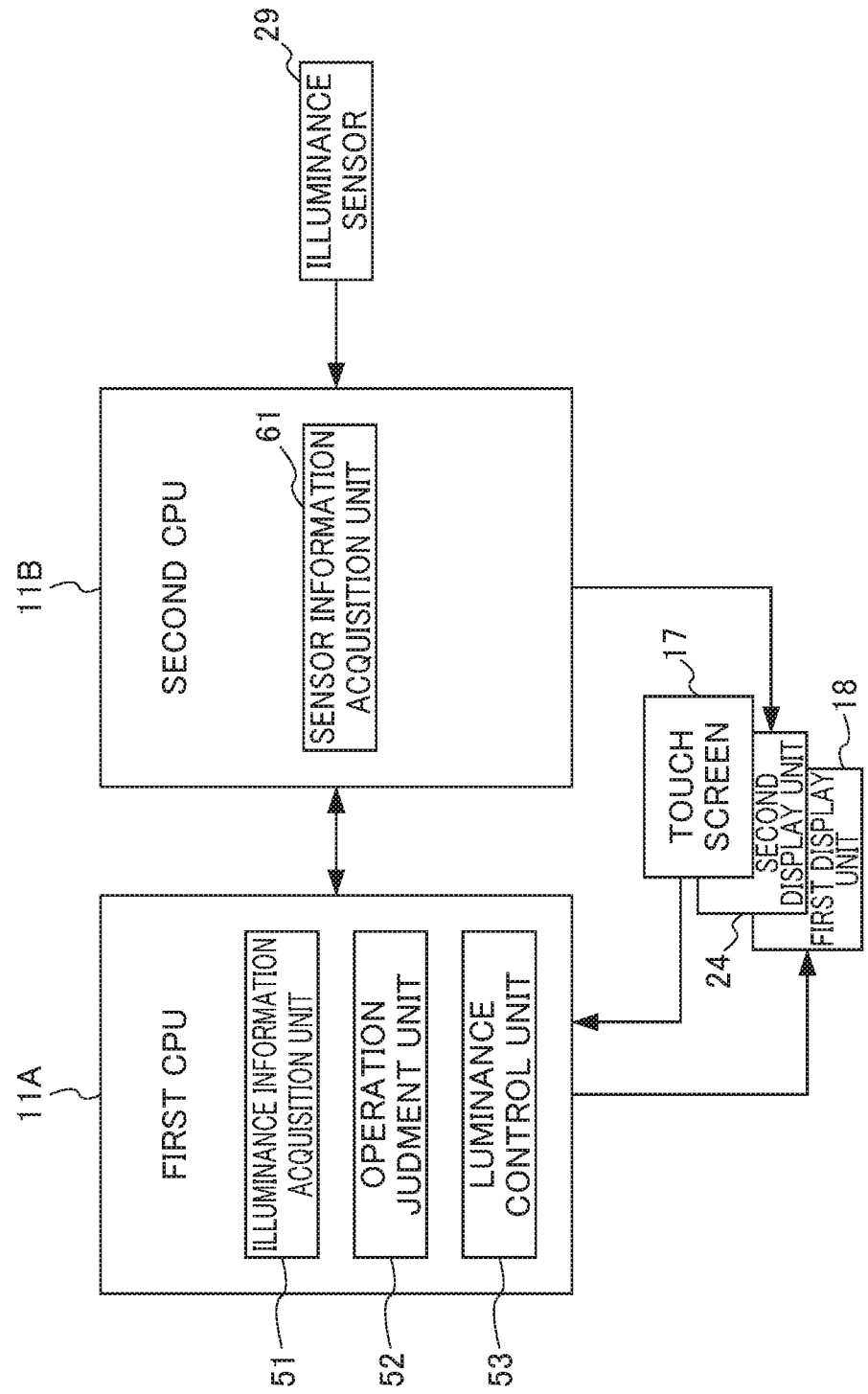

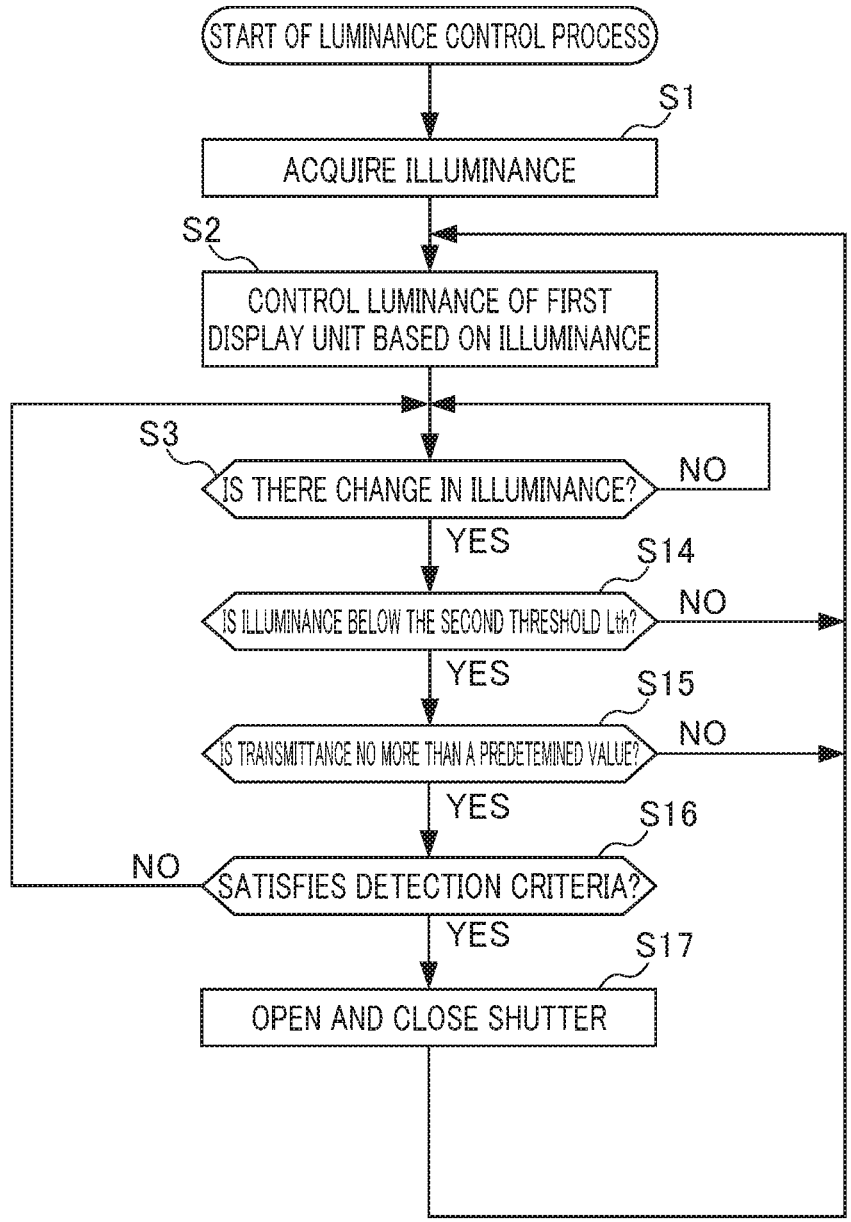

ELECTRONIC APPARATUS, LUMINANCE CONTROL METHOD, AND STORAGE MEDIUM

TECHNICAL FIELD

The present invention relates to an electronic apparatus, a luminance control method, and a storage medium.

Conventionally, an illuminance sensor is placed behind the light-irradiated surface of a display unit, and the illuminance of the display unit is adjusted according to the amount of outside light detected by the illuminance sensor.

PRIOR ART DOCUMENT

Patent Document

Patent Document 1: US 2014/0132158

DISCLOSURE OF THE INVENTION

Problems to be Solved by the Invention

However, in the above-mentioned configuration, if the display is temporarily covered by some obstacle, the amount of outside light incident on the illuminance sensor is temporarily reduced even though the outside light does not change. In this case, the illuminance sensor has not been able to accurately detect the outside light, and the luminance of the display unit: could not be adjusted properly.

The present invention is made in view of such a situation, and an object to provide an electronic apparatus that can adjust the luminance appropriately in an electronic apparatus in which an illuminance sensor is arranged on the back side of a display part.

Means for Solving the Problems

In order to achieve the above object, an electronic apparatus or one aspect of the present invention includes: a display unit, a light detecting unit arranged on a back side of a display surface of said display unit, a luminance control unit configured to control luminance of said display unit based on information related to light detected by the light detection unit, and a judgement unit configured to judge the reliability of the information related to light detected by the light detection unit, wherein the luminance control unit controls the luminance of the display unit when judged that the reliability is high, and the luminance control unit suppresses control of the luminance of the display unit when judged that the reliability is low.

Effects of the Invention

According to the present invention, it is possible to provide an electronic apparatus, in which an illuminance sensor is arranged on the back side of a display unit, capable of performing appropriate luminance adjustment.

BRIEF DESCRIPTION OF THE DRAWINGS

FIG. 4 is a functional block diagram showing a functional configuration for executing a first luminance control process, among the functional configurations of the electronic apparatus of FIG. 2;

and FIG. 7 is a flowchart for explaining the flow of the second luminance control process executed by the electronic apparatus of FIG. 1 having the functional configuration of FIG. 6.

PREFERRED MODE FOR CARRYING OUT THE INVENTION

Figure 1:
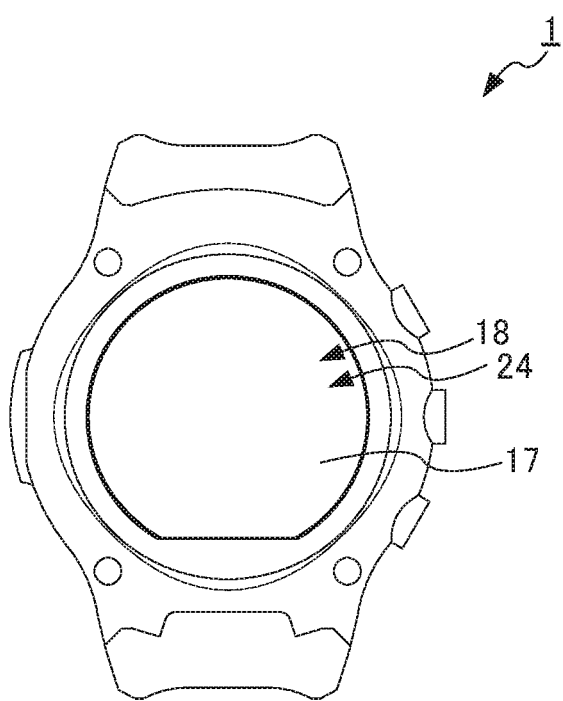
FIG. 1 is a schematic diagram of an electronic apparatus of the first embodiment of the present invention.

The electronic apparatus of the present invention is provided with a display unit, an illuminance sensor, and a luminance control unit. The illuminance sensor is disposed on the back side of the display surface of the display unit. The luminance control unit controls the luminance of the display unit based on the information about the light detected by the illuminance sensor and the degree of certainty of the information related to the light.

In the first embodiment, the luminance is controlled based on the illuminance detected by the illuminance sensor and the accuracy (reliability) judged according to the presence or absence of operation of the touch screen of the display unit. For example, when no operation of the touch screen is performed, the accuracy is judged to have a predetermined value or more (i.e., the reliability is judged to be high), and the luminance control unit controls the luminance based on the illuminance detected by the illuminance sensor. On the other hand, for example, when operation of the touch screen is performed, the accuracy is judged to be less than a predetermined value (i.e., the reliability is judged to be low), and the luminance control unit suppresses the control of luminance based on the illuminance detected by the illuminance sensor. In other words, when the accuracy is judged to be less than a predetermined value (i.e., when the reliability is judged to be low, the luminance control unit does not control the luminance. Alternatively, when the accuracy is judged to be at least a predetermined value (i.e., when the accuracy is judged to be high), the luminance control unit guesses the change (reduction) in illuminance caused by the operation of the touch screen, and controls the luminance taking into account the amount of change. In the second embodiment, the luminance is controlled based on the illuminance detected by the illuminance sensor and the accuracy (reliability) judged according to the state of the liquid crystal display screen. For example, when the liquid crystal display screen is in a transparent state, the accuracy is judged to be more than a predetermined value (i.e., the reliability is judged to be high), and the luminance is controlled based on the illuminance detected by the illuminance sensor. On the other hand, for example, when the liquid crystal display screen is not in a transparent state, the accuracy is judged to be less than a predetermined value (i.e., it is judged to have low reliability), and the luminance control section suppresses the control of luminance based on the illuminance detected by the illuminance sensor. In other words, when the accuracy is judged to be less than a predetermined value (i.e., when the reliability is judged to be low), the luminance control unit does not control the luminance. Alternatively, when the accuracy (reliability) is judged to be higher than a predetermined value (i.e., if the reliability is judged to be high), the luminance control unit estimates the amount of change (reduction) in illuminance caused by the absence of transparency of the liquid crystal screen, and controls the luminance taking into account the amount of change. Thus, the luminance control unit in each embodiment controls the luminance of the display unit when the accuracy of the information about light detected by the illuminance sensor is more than a predetermined value (i.e., when it is judged to be highly reliable). In other words, when the accuracy (reliability) of the amount of light detected by the illuminance sensor 29 is judged and the accuracy (reliability) is judged to be high, the luminance of the display unit is adjusted. In addition, when the accuracy (reliability) is judged to be low, the control of the luminance of the display area is suppressed compared to the case where the accuracy is judged to be high. In this way, appropriate luminance adjustments are made.

The embodiment of the present invention is described below by means of drawings.

[Configuration]

FIG. 1 is a schematic view of an electronic apparatus 1 of the first embodiment of the present invention. As shown in FIG. 1, the electronic apparatus 1 of the present embodiment is configured as a wristwatch-type device (e.g., a smartwatch). In addition, the electronic apparatus 1 has a first display unit 18 and a second display unit 24 (to be described later), and the second display unit 24 stacked on top of the first display unit 18. In addition, a touch screen 17, which will be described later, is provided above the second display area 24. Therefore, the electronic apparatus 1 can display the display of the first display unit 18 to be overlaid on the display of the second display unit 24, and it is possible to operate the display contents by touch.

Figure 2:
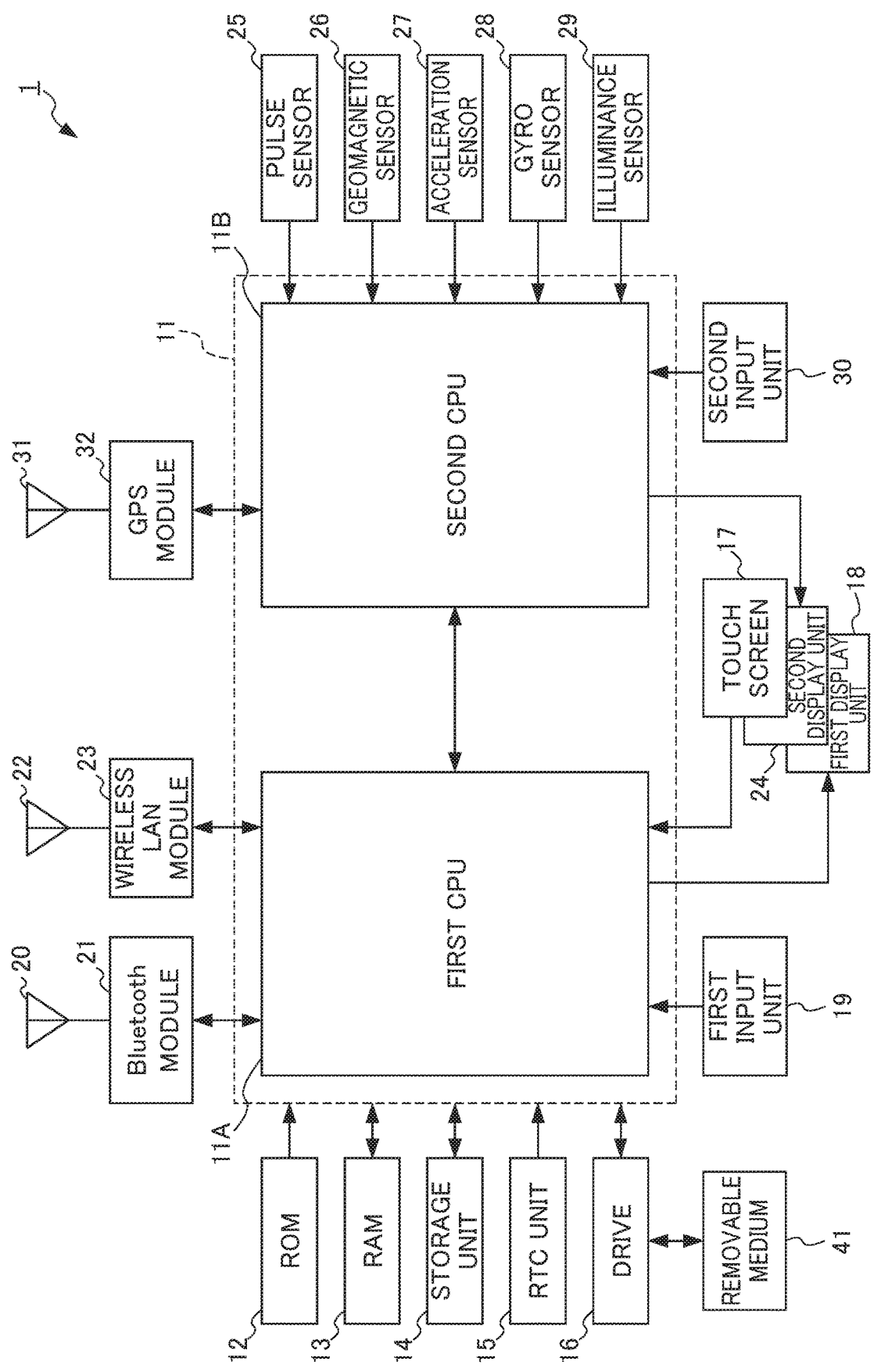
FIG. 2 is a block diagram showing the hardware configuration of an electronic device.

FIG. 2 is a block diagram illustrating a hardware configuration of the electronic apparatus 1. As illustrated in FIG. 2, the electronic apparatus 1 includes a CPU (Central Processing Unit, processing device) 11, a ROM (Read Only Memory) 12, a RAM (Random Access Memory) 13, a storage unit 14, an RTC (Real Time Clock) unit 15, a drive 16, the touch screen 17, the first display unit 18, a first input unit 19, a Bluetooth (registered trademark) antenna 20, a Bluetooth (registered trademark) module 21, a wireless LAN (Local Area Network) antenna 22, a wireless LAN module 23, the second display unit 24, a pulse sensor 25, a geomagnetic sensor 26, an acceleration sensor 27, a gyro sensor 28, an illuminance sensor 29, a second input unit 30, a GPS (Global Positioning System) antenna 31, and a GPS module 32.

The CPU 11 includes a firsr CPU 11A and a second CPU 11B. The first CPU 11A performs various arithmetic processing and executes processing of the operating system, thereby controlling functions in the electronic apparatus 1. These functions are similar to those of a smartphone. In the present embodiment, the first CPU 11A causes the first display unit 18 to display messages related to incoming e-mails and weather information received via the Bluetooth (registered trademark) module 21 or the wireless LAN module 23, and accepts an operation inputted via the touch screen 17. Further, the first CPU 11A recognizes speech that is inputted through the first input unit 19, and performs processing related to various functions implemented as functions similar to those of a smartphone. In the present embodiment, the first CPU 11A further acquires time signals from the RTC unit 15 at predetermined timing.

The second CPU 11B executes processing of a specific program to thereby instruct the second display unit 24 to perform display, acquire detection results from various sensors, and perform processing relating to various functions implemented as functions of a wristwatch. In the present embodiment, the second CPU 11B, for example, calculates the time of day and displays the time, the day of the week, the date, and the like on the second display unit 24, with the time signals inputted from the first CPU 11A as a reference. The processing of the specific program (calculation of the time of day, etc.) executed by the second CPU 11B is a relatively simple operation as compared with the processing of the OS executed by the first CPU 11A. Therefore, the processing load of the second CPU 11B is small and the processing is executable with lower power consumption. For this reason, the specifications of the hardware required for the second CPU 11B are lower than those of the hardware required for the first CPU 11A.

The ROM 12 is able to read data from the first CPU 11A and the second CPU 11B, respectively, and stores various programs executed by the first CPU 11A and the second CPU 11B, and initial setting data. For example, the ROM 12 stores an OS program executed by the first CPU 11A, various programs executed under the control of the OS, or a specific program executed by the second CPU 11B (here, a built-in program that realizes the functions of a wristwatch).

The RAM 13 is able to read and write data from the first CPU 11A and the second CPU 11B, respectively, and provides working memory space for the first CPU 11A and the second CPU 11B to store working temporary data. For example, the RAM 13 provides system area and work area when the OS is executed by the first CPU 11A, and provides storage area when a specific program is executed by the second CPU 11B.

The storage unit 14 is nonvolatile memory that is able to read and write data from the first CPU 11A and the second CPU 11B, respectively, and includes, for example, flash memory or EEPROM (Electrically Erasable and Programmable Read Only Memory). The storage unit 14 stores various data (data of various setting contents, etc.) generated by various functions similar to those of smartphones, the functions of a wristwatch, etc.

A removable medium 41 including, for example, semiconductor memory is appropriately mounted on the drive 16. The removable medium 41 is able to store various data such as data detected by various sensors. The touch screen 17 is, for example, a touch screen of a capacitance type or a resistive film type provided on a display screen of the second display unit 24. The touch screen 17 detects a touch operation position and an operation content that are operated by the user on the operation surface, and generates a signal corresponding to the operation, thereby outputting the resultant signal as an input signal to the first CPU 11A.

The first display unit 18 includes, for example, an organic electroluminescence (EL) display (Organic Light Emitting Diode), and displays various types of information on a display screen in accordance with control of the first CPU 11A. The first input unit 19 includes a microphone for converting sound into an electric signal, and outputs a signal indicating an inputted sound (e.g., a sound command for operation) to the first CPU 11A.

The Bluetooth (registered trademark) antenna 20 is an antenna for transmitting and receiving electromagnetic waves based on the Bluetooth (registered trademark) standard, and is configured by, for example, a monopole antenna or the like. The Bluetooth (registered trademark) antenna 20 transmits, as an electromagnetic wave, an electric signal of wireless communication inputted from the Bluetooth (registered trademark) module 21, and converts the received electromagnetic wave into an electric signal to output the resultant electric signal to the Bluetooth (registered trademark) module 21. The Bluetooth (registered trademark) module 21 transmits signals to another device via the Bluetooth (registered trademark) antenna 20 in accordance with an instruction from the first CPU 11A. Further, the Bluetooth (registered trademark) module 21 receives a signal transmitted from another device, and outputs information indicated by the received signal to the first CPU 11A.

The wireless LAN antenna 22 is an antenna that is able to receive radio waves of a frequency corresponding to wireless communication used by the wireless LAN module 23, and is configured by, for example, a loop antenna or a rod antenna. The wireless LAN antenna 22 transmits, as an electromagnetic wave, an electric signal of wireless communication inputted from the wireless LAN module 23, converts the received electromagnetic wave into an electric signal to thereby output the resultant electric signal to the wireless LAN module 23. The wireless LAN module 23 transmits signals to another device via the wireless LAN antenna 22 in accordance with an instruction from the first CPU 11A. The wireless LAN module 23 also receives a signal transmitted from another device and outputs the information indicated by the received signal to the first CPU 11A.

The second display unit 24 includes a PN (Polymer Network) liquid crystal display that allows light to transmit partially or entirely, and dispLays various kinds of information on a display screen, for example, in a manner of segment display in accordance with to the control of the second CPU 11B. In the present embodiment, the PN liquid crystal display, which is the second display unit 24, is stacked on the display screen of the organic EL display, which is the first display unit 18, as illustrated in FIG. 3B. As for the PN liquid crystal display, in a portion where a potential is not applied, liquid crystal molecules are arranged irregularly, which allows light to be reflected. In other words, display by the PN Liquid crystal display is performed at a portion where the potential is not applied. On the other hand, in a portion where the potential is applied, the liquid crystal molecules are arranged perpendicularly to the display screen, which allows the light to be transmitted. In other words, in the portion where the potential is applied, the light outputted from the organic EL display is allowed to be transmitted therethrough, which allows the display by the organic EL display to be visually recognized through the PN liquid crystal display. In other words, in the display area of the electronic apparatus 1, display is allowed to be performed in a state in which the display by the second display unit 24 is superimposed on the display by the first display unit 18. Thus, the function to cause alignment/misalignment of the liquid crystal molecules inhibits light transmission. The configuration of the PN liquid crystal display in the present embodiment is referred to as the "liquid crystal shutter" in reference to this function. The state in which light can be reflected by the liquid crystal molecules is referred to as the "closed state of the liquid crystal shutter" and the state in which light can be transmitted by the liquid crystal molecules is referred to as the "open state of the liquid crystal shutter".

The pulse sensor 25 is installed on the back face side (a side that faces the arm of a user) of the electronic apparatus 1, and detects the pulse of the user who wears the electronic apparatus 1. The geomagnetic sensor 26 detects the direction of the geomagnetism, and outputs information indicating the detected direction of the geomagnetism to the second CPU 11B. The acceleration sensor 27 detects acceleration in three axial directions in the electronic apparatus 1, and outputs information indicating the detected acceleration to the second CPU 11B. The gyro sensor 28 detects angular velocities in the three axial directions in the electronic apparatus 1, and outputs information indicating the detected angular velocities to the second CPU 11B.

The illuminance sensor 29 is installed at a predetermined location on the back face side of the first display unit 18, detects brightness (illuminance) in the display area of the electronic apparatus 1, and outputs information indicating the detected brightness to the second CPU 11B. As will be described later, the first CPU 11A executes processing of adjusting the luminance of the display screen of the first display unit 18 on the basis of the brightness detected by the illuminance sensor 29 (the first luminance control process and the second luminance control process described later).

Figure 3A:
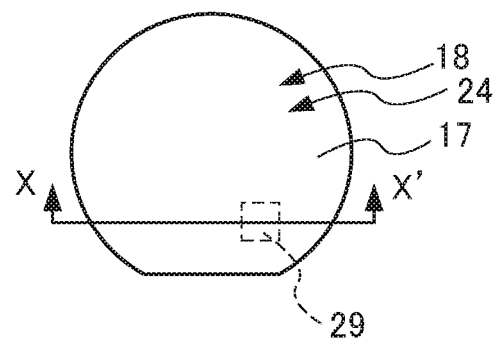
FIG. 3A is a schematic diagram showing an installation form of an illuminance sensor in a display area of an electronic apparatus.
Figure 3B:
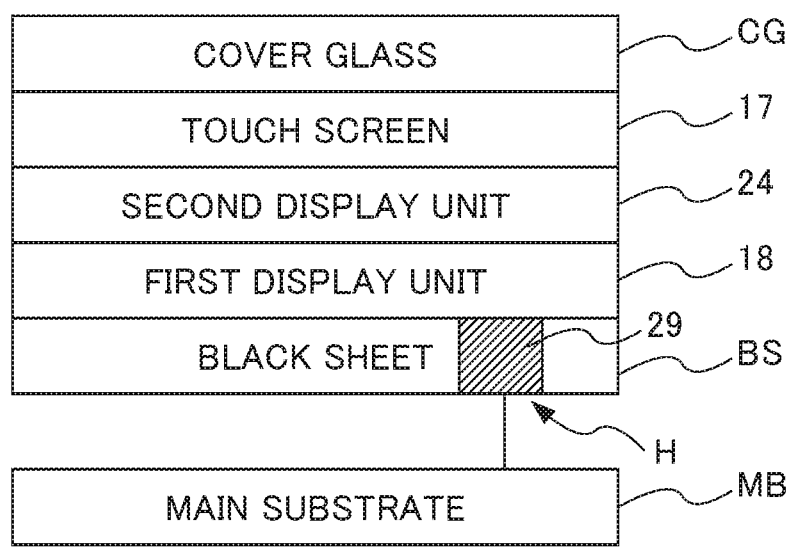
FIG. 3B is a schematic diagram showing a cross section along the line X-X' in FIG. 3A.

FIG. 3A is a schematic diagram illustrating an installation form of the illuminance sensor 29 in the display area of the electronic apparatus 1. FIG. 3B is a schematic diagram illustrating a cross section taken along line X-X' in FIG. 3A. As illustrated in FIG. 3A, the illuminance sensor 29 is installed at a predetermined location in the display areas of the first display unit 18 and the second display unit 24. The predetermined location is, for example, a location at the lower right of the center denoted by a broken line in FIG. 3B. As illustrated in FIG. 3B, the display area of the electronic apparatus 1 has a cross-sectional structure in which a cover glass CG, the touch screen 17, the second display unit 24, the first display unit 18, a black sheet BS, and a main substrate MB are stacked in this order from the front face side.

Among these, the black sheet BS is a member that adjusts color development when viewed through the second display unit 24 and the first display unit 18. In the present embodiment, black color is visually recognised. Further, a through hole H is formed in a part of the black sheet BS, and the illuminance sensor 29 is installed in the through hole H. Therefore, the illuminance sensor 29 has a structure in which light enters from the front face side of the display area of the electronic apparatus 1. This structure makes it possible to detect that, for example, the electronic apparatus 1 is placed under bright external light and thus the illuminance of the display area becomes high, and that the touch screen 17 of the electronic apparatus 1 is operated by a user and covered by the user's finger and thus the illuminance of the display area becomes low.

Referring back to FIG. 2, the second input unit 30 comprises various buttons that input various information in response to a user's instruction operation. The GPS antenna 31 receives radio waves transmitted from satellites in the GPS, converts them into electrical signals, and outputs the converted electrical signals (hereinafter referred to as "GPS signals") to the GPS module 32. The GPS module 32 detects the position (latitude, longitude, altitude) of the electronic apparatus 1 and the current time indicated by the GPS on the basis of the GPS signal inputted from the GPS antenna 31.

Further, the GPS module 32 outputs information indicating the detected position and the current time to the second CPU 11B.

Functional Configuration of the First Embodiment

Next, the functional configuration of the electronic apparatus 1 is explained. FIG. 4 is a functional block diagram illustrating a functional configuration for executing the first luminance control process among the functional configurations of the electronic apparatus 1 of FIG. 2. The first luminance control process is a series of processes to control the luminance of the display screen of the first display unit 16 based on the illuminance detected by the illuminance sensor 29.

When the first luminance control process is executed, as shown in FIG. 4, the illuminance information acquisition unit 51, the operation judgement unit 52, and the luminance control unit 53 function in the first CPU 11A, and the sensor information acquisition unit 61 functions in the second CPU 11B. The illuminance information acquisition unit 51 acquires the illuminance detected by the sensor information acquisition unit 61 of the second CPU 11B. The operation judgement unit 52 judges whether or not the user is performing a touch operation on the display area of the electronic apparatus 1 based on the detection result of the touch screen 17. At this time, the operation judgement unit 52 detects the position where the user is performing a touch operation in the display area.

The luminance control unit 53 controls the luminance of the first display unit 18 based on the illuminance obtained by the illuminance information acquisition unit 51. In other words, when the electronic apparatus 1 is placed in a bright (highly illuminated) environment, the luminance control unit 53 controls the luminance of the first display unit 18 to a high luminance in accordance with the detected illuminance in order to prevent the display screen from becoming relatively dark and difficult to see. On the other hand, when the electronic device 1 is placed in a dark (low illuminance) environment, the luminance control unit 53 controls the luminance of the first display unit 18 to a low luminance corresponding to the detected illuminance in order to prevent the display screen from becoming excessively bright and difficult to see. For example, the luminance value corresponding to the illuminance in stored in the electronic apparatus 1 in the form of table data or as a predetermined function, and the luminance control unit 53 controls the luminance by referring to the table data or a predetermined function as appropriate.

In addition, the luminance control unit 53 controls the luminance of the first display unit 18 based on the illuminance obtained by the illuminance information acquisition unit 51 and the judgment result of the operation judgement unit 52. For example, when the illuminance in the display area of the electronic apparatus 1 is below the predetermined threshold Lth, the luminance control portion 53 determines whether or not the user is performing a touch operation. Then, when the user is performing a touch operation, it is presumed that the display area of the electronic apparatus 1 is covered by the user's operation (e.g., finger, hand, etc.), and the luminance control unit 53 maintains the previous luminance (e.g., the luminance just before the touch operation is detected) without adjusting the luminance of the first display unit 18. On the other hand, if the user does not perform a touch operation, the environment of the electronic apparatus 1 itself becomes dark and the illuminance is presumed to be low. Therefore, the luminance control unit 53 adjusts the luminance of the first display unit 18 and lowers the luminance according to the illuminance obtained by the illuminance information acquisition unit 51. The threshold Lth can be set by obtaining the illuminance of the display area of the first display area 18 when the user touches the display area. The sensor information acquisition unit 61 obtains the detected values detected by various sensors, such as the illuminance detected by the illuminance sensor.

Operation of the First Embodiment

Figure 5:
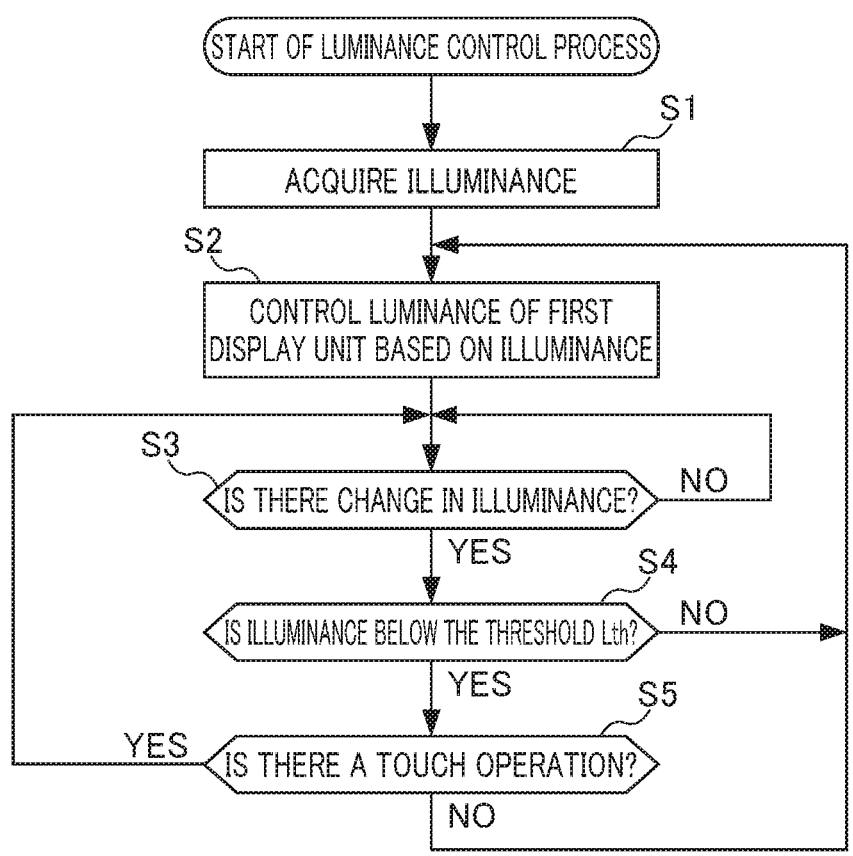
FIG. 5 is a flowchart for explaining the flow of the first luminance control process executed by the electronic apparatus of FIG. 1 having the functional configuration of FIG. 4.

FIG. 5 is a flowchart illustrating a flow of the first luminance control process executed by the electronic apparatus 1 of FIG. 1 having the functional configuration of FIG. 4. The first luminance control process starts when the power of the electronic apparatus 1 is turned on and ends when the operation to turn off the power of the electronic apparatus 1 is performed. In Step S1, the illuminance information acquisition unit 51 obtains the illuminance detected by the sensor information acquisition unit 61 of the second CPU 11B. In Step S2, the luminance control unit 53 controls the luminance of the first display unit 18 based on the obtained illuminance.

In Step S3, the luminance control unit 53 judges whether the illuminance is changing or not. At this time, for example, it can be judged that the illuminance is changing when the illuminance is changing by at least the threshold of the predetermined amount of change. If the illuminance does not change, it is judged to be NO in Step S3, and the process of Step S3 is repeated. On the other hand, when the illuminance is changing, it is judged to be YES in Step S3, and the process moves to Step S4.

In Step S4, the luminance control unit 53 judges whether or not the illuminance is less than or equal to the predetermined threshold Lth. If the illuminance is not less than the predetermined threshold Lth, it is judged to be NO in Step S4, and the process moves to Step S2. In other words, if the illuminance is higher than the illuminance assumed when the user is operating a touch operation in the display area of the first display unit 18, the luminance adjustment is executed. On the other hand, if the illuminance is no more than the predetermined threshold Lth, it is judged to be YES in Step S4, and the process moves to Step S5.

In step S5, the operation judgement unit 52 judges whether or not the user is performing a touch operation in the display area of the electronic apparatus 1 based on the detection result of the touch screen 17. If the user does not perform a touch operation in the display area of the electronic apparatus 1, it is judged to be NO in Step S5, and the process moves to Step S2. In this case, since it is presumed that the environment of the electronic apparatus 1 itself is darkened, the luminance adjustment is performed. On the other hand, if the user performs a touch operation in the display area of the electronic apparatus 1, it is judged to be YES in Step S5, and the process moves to Step S3. In this case because the display area of the electronic apparatus 1 is presumed to be covered by the user's operation (e.g., finger, hand, etc.) because the user is performing a touch operation, and the illuminance is presumed to be temporarily degraded, luminance adjustment is not performed. That is, the luminance control unit 53 judges the accuracy (reliability) of the information related the light detected by the illuminance sensor 29 based on the detection result of the touch screen 17. If the luminance control unit 53 judges that the accuracy is more than a predetermined value, i.e. the information related to the light is highly reliable, the luminance control unit 53 performs the luminance adjustment. Here, a case where the accuracy is more than a predetermined value (high reliability) is a case where the user does not perform a touch operation (when it is judged to be NO in step S5).

As a result of such a process, the luminance of the display screen of the first display unit 18 is adjusted according to the illuminance of the display area in the electronic apparatus 1, and when the illuminance of the display area is less than the predetermined threshold Lth, a judgment is made as to whether or not the user is performing a touch operation. When the user is performing a touch operation, the display area of the electronic apparatus 1 is covered by the user's operation (e.g., finger or hand) and the illuminance is presumed to be temporarily degraded; therefore, the luminance of the first display unit 18 is not adjusted and the previous luminance ia maintained. Therefore, in the electronic apparatus 1 in which the illuminance sensor 29 is located behind the first display unit 18, it is possible to prevent the user from adjusting the luminance of the first display unit 18 by mistake, even if the user operates the touch panel 17.

Functional Configuration of the Second Embodiment

Figure 6:
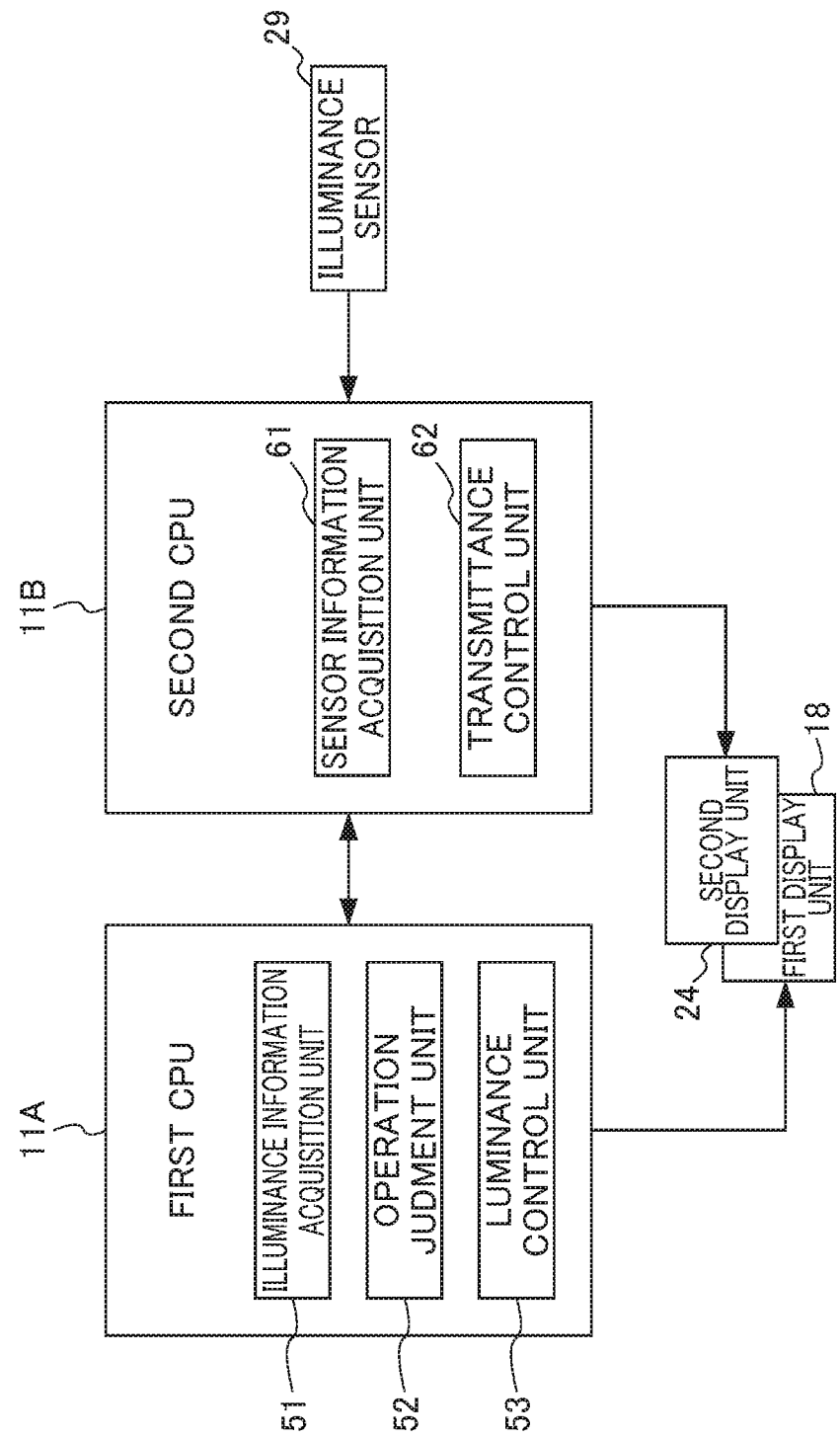
FIG. 6 is a functional block diagram showing a functional configuration for executing a second luminance control process, among the functional configurations of the electronic apparatus of FIG. 2.

FIG. 6 is a functional block diagram showing a functional configuration for executing a second luminance control process among the functional configurations of the electronic apparatus 1 of FIG. 2. The functional configuration of the electronic apparatus 1 according to the second embodiment is described below with reference to FIG. 6. The difference from the first embodiment is that the transmittance control unit 62 is further provided in the second CPU 11B. In the first embodiment, the luminance adjustment is suppressed according to the presence or absence of operation of the touch panel; however, in the second embodiment, the luminance adjustment is suppressed according to the opened/closed state of the liquid crystal shutter by the transmittance control unit 62. Since the hardware configuration of the first embodiment is the same as that of the second embodiment, the explanation is omitted. In the hardware configuration and functional configuration, the same reference symbol is attached to the same elements as in the first embodiment.

Since the function of the aenaor information acquisition unit 61 is the same as in the first embodiment, the explanation is omitted. The transmittance control unit 62 controls the transmittance of the PN liquid crystal display that is the second display unit 24. As mentioned above, a PN liquid crystal display transmits incident light in an area where the potential is applied, but does not transmit incident light in an area where the potential is not applied. The transmittance control part 62 controls the second display unit 24 with or without a potential according to the operation of the second input unit 30. When this input operation is performed, the design of the display contents changes, for example, the black and white color of the display contents of the second display unit 24 are reversed.

When the second luminance control process is executed, as shown in FIG. 6, in the first CPU 11A, the illuminance information acquisition unit 51, the operation judgement unit 52, and the luminance control unit 53 function, and in the second CPU 12B, the sensor information acquisition unit 61 and the transmittance control unit 62 function. The illuminance information acquisition unit 51 obtains the illuminance detected by the sensor information acquisition unit 61 of the second CPU 11B. The operation judgement unit 52 judges whether the liquid crystal shutter is in an opened or closed state in the second display unit 24 by detecting the user's input operation to the second input unit 30. The transmittance control unit 62 changes the transmittance of the PN liquid crystal display of the second display unit 24 when a user's input operation for the second input portion 30 is detected. The transmittance is, for example, a binary value of the open (transmissive) or closed (relatively non-transmissive) state of the liquid crystal shutter.

Operation of the Second Embodiment

FIG. 7 is a flowchart for explaining the flow of the second luminance control process executed by the electronic apparatus 1 of FIG. 1 having the functional configuration of FIG. 6. The operations of Steps S1 to S3 are the same as those of the first embodiment. In other words, in Step S1, the illuminance information acquisition unit 51 obtains the illuminance, and in Step S2, the luminance control unit 53 controls the luminance of the first display unit 18 based on the obtained illuminance. In step S3, the luminance control unit 53 judges whether or not the illuminance is changing. If the illuminance has not changed, the process of Step S3 is repeated, and if the illuminance has changed, the process moves to Step S14.

In Step S14, the luminance control unit 53 judges whether or not the illuminance is less than or equal to the predetermined second threshold Lth. If the illuminance is not less than the predetermined second threshold Lth, it is judged to be NO in Step S14, and the process moves to Step S2. Here, the second threshold Lth is, for example, the illuminance that is assumed when the liquid crystal shutter is closed. The second threshold Lth is, for example, a value derived from actual measured values under multiple conditions, and is recorded in advance at the time of shipment, etc. In other words, in Step S14, it is estimated whether the liquid crystal shutter of the second display unit 24 is open or not based on the illuminance obtained by the illuminance information acquisition unit 51. If the illuminance is higher than the illuminance assumed to be in the closed state, the luminance control section 53 assumes that the liquid crystal shutter is in the opened state and moves to Step S2 to adjust the luminance of the first display area 18 based on the obtained illuminance. On the other hand, if the illuminance is less than or equal to the predetermined second threshold Lth, it is judged to be YES in Step S14, and the process moves to Step S5.

In Step S15, the operation judgement unit 52 judges the transmittance of the second display unit 24, that is, the open/close state of the liquid crystal shutter, based on the control of the transmittance control unit 62. When the operation judgement unit 52 judges that the liquid crystal shutter is open, it judges NO in Step S15, and the process moves to Step S2. In this case, it is presumed that the environment of the electronic apparatus 1 itself is darkened, so the luminance adjustment is performed. On the other hand, when the operation judgement unit 52 judges that the liquid crystal shutter is in the closed state, it judges YES in Step S15, and the process moves to Step S16. In this case, it is presumed that the display area of the electronic apparatus 1 is covered by the liquid crystal shutter with the liquid crystal shutter in the closed state and the illuminance is reduced. In other words, the illuminance is presumed to be degraded because a part of the incident light of the illuminance sensor is blocked by the liquid crystal shutter. If the shutter remains closed, the luminance control unit 53 cannot detect the exact amount of outside light according to the environment, so the luminance control unit 53 does not adjust the luminance and the process advances to Step S16. In other words, the operation judgement unit 52 judges the accuracy (reliability) of the information of the light detected by the illuminance sensor 29 based on the detection result of the opened/closed state of the liquid crystal shutter, and the luminance control unit 53 adjusts the luminance when the accuracy is judged to be more than a predetermined value, i.e., when the reliability of the light information is high. Here, a case where the accuracy is at least a predetermined value (high reliability) is a case where the liquid crystal shutter is open (when it is judged to be NO in Step S15).

In Step S16, when the operation judgment portion 52 judges that the electronic apparatus 1 satisfies a predetermined condition, the process advances to Step 17. In Step 17, the transmittance control unit 62 keeps the liquid crystal shutter temporarily opened. A predetermined condition is, for example, when the user causes so-called tilt of the electronic apparatus 1, when the second input unit 30 receives an operation to open the liquid crystal shutter from the user, or when the second input unit 30 does not receive any operation for a predetermined time.

In Step S17, the liquid crystal shutter is temporarily opened, and the illuminance sensor 29 receives outside light that is not blocked by the liquid crystal shutter. While the liquid crystal shutter is opened, the illuminance sensor 29 may obtain a more accurate illuminance based on the external light in accordance with the environment of the electronic apparatus 1.

FIRST MODIFIED EXAMPLE

In the above-mentioned first embodiment, when the illuminance in the display area of the electronic apparatus 1 is less than or equal to the threshold value of Lth, and it is determined by the operation judgement unit 52 that the user is performing a touch operation on the display area of the electronic apparatus 1, the luminance of the first display area 18 is not controlled by the luminance control unit 53. On the other hand, when the illuminance in the display area of the electronic equipment 1 is less than or equal to the threshold value of Lth, the operation judgment portion 52 may determine whether or not the user touches the display area in which the illuminance sensor 29 is installed (hereinafter referred to as the "influence area") in the display area of the electronic device 1, and if it is determined that the user touches the influence area, the luminance of the first display unit 18 may not be controlled by the luminance control unit 53. By performing such control, it is possible to more accurately detect a situation in which the display area of the electronic device 1 is covered by a user's operation (finger, hand, etc.) and the illuminance is temporarily degraded, and to reflect this situation in the luminance adjustment of the first display unit 18.

SECOND MODIFIED EXAMPLE

In the above-mentioned first embodiment, when the luminance control unit 53 controls the luminance of the first display unit 18, the luminance control unit 53 may judge the amount of light that the first display unit 18 itself emits according to the current display content, and may execute the first luminance control process after correcting the variation in the detection result of the illuminance generated by the amount of light. In other words, in the above-mentioned embodiment, the luminance of the first display unit 18 is adjusted based on the illuminance obtained by the illuminance information acquisition unit 51 and the judgment result of whether or not the user is performing a touch operation, or the previous luminance is maintained without adjusting the luminance of the first display unit 18. In contrast, in the present modified example, since the display content displayed by the first display portion 18 in the area corresponding to the position of the illuminance sensor 29 is known by the electronic apparatus 1, the irradiation light based on the display content is reflected by a finger, etc. of the user and the components that affect the detection result of the illuminance sensor 29 are estimated. Then, the illuminance change in the display area of the first display unit 18 is judged after subtracting the component of the illuminance change based on the display content of the first display unit 18 from the detection result of the illuminance sensor 29 out of the total illuminance change detected. As a result, it is possible to adjust the luminance of the first display unit 18 by suppressing the influence of the display contents of the first display unit 18. It should be noted that the configuration of the present modified example is not limited to a case of determining whether or not a finger is present on the touch screen 17 (whether or not the user is performing a touch operation) as described above. In other words, when the luminance control portion 53 controls the luminance of the first display unit 18, the luminance control portion 53 always judges the amount of light emitted according to the light emitted by the first display unit 18 itself when detecting outside light, and may control the luminance of the first display unit 18 based on the detection result of subtracting the component of light according to the light emitted by the said first display unit 18 itself from the illuminance detected by the illuminance sensor 29. In this way, it is possible to adjust the luminance of the first display unit 18 based on an accurate illuminance in which the influence of the light emission of the first display unit 18 itself is suppressed.

THIRD MODIFIED EXAMPLE

In the above-mentioned second embodiment, the detection condition at Step S16 in FIG. 7 is a case where tilt occurs, etc. However, as another embodiment, it may be the following cases. For example, it may be a case where the illuminance that is always acquired by the illuminance sensor 29 suddenly changes. In this case, if the illuminance changes rapidly in Step S16, the process moves to Step S17. In Step S17, the illuminance sensor 29 detects the illuminance when the liquid crystal shutter is open. As a result, the illuminance sensor 29 can detect an accurate illuminance in response to changes in the environment.

FOURTH MODIFIED EXAMPLE

In the above-mentioned embodiment, as shown in FIG. 2, etc., the electronic apparatus 1 is provided with a first display unit 18 and a second display unit 24; however, it may be configured not provided with the first display unit 18. In this case, the luminance control portion 53 adjusts the luminance of the second display unit 24 based on the illuminance detected by the illuminance sensor 29. In other words, the electronic apparatus 1 of the present modified example may be a configuration not provided with the first display unit 18, and in which the second display unit 24 is configured by a liquid crystal shutter and a backlight. In this case, the illuminance sensor 29 is arranged on the back side of the second display unit 24 to detect information about the light. When the operation judgment part 52 judges that the accuracy of the information related to the light is more than a predetermined value, that is, when it judges that the information related to the light is highly reliable, the luminance control unit 53 adjusts the luminance of the backlight of the second display unit 24.

FIFTH MODIFIED EXAMPLE

In another modified example, the first display unit 18 may be configured to function as a backlight rather than a display unit. In this case, the display unit which displays the display contents is the second display unit 24, and the OLED that is the first display unit 18 in the figure functions as a backlight. In this case, the illuminance sensor 29 is arranged on the back side of the second display unit 24 to detect information related to the light. When the operation judgement unit 52 judges that the accuracy of the light information is higher than a predetermined value, i.e., when the light information is judged to be highly reliable, the luminance control unit 53 adjusts the luminance of the OLED.

SIXTH MODIFIED EXAMPLE

As another embodiment, when it is judged to be YES in Step S5 of the first embodiment, i.e., when the user is operating the touch screen 17, the luminance control portion 53 may suppress the control of luminance. In this case, the illuminance reduction value caused by the touch screen 17 being operated instead of not being operated is stored in the ROM 12 in advance, and this reduction value is used in the control of the luminance. For example, the luminance control unit 53 estimates the illuminance when the touch screen 17 is not operated by adding an illuminance equivalent to a previously held reduction loss value to the illuminance detected when the touch screen 17 is operated. The luminance control unit 53 controls the luminance of the first display unit 18 based on the estimated illuminance. Thus, the luminance control unit 53 may suppress the normal luminance control when there is no touch operation, and may perform different control.

SEVENTH MODIFIED EXAMPLE

As another modification example, when it is judged to be YES in Step S16 of the second embodiment, that is, when the liquid crystal shutter is in a closed state, the luminance control unit 53 may suppress the control of luminance. In this case, the illuminance reduction value caused by the liquid crystal shutter going from the open state to the closed state is stored in advance in the ROM 12, and this reduction value is used in the control of the luminance. For example, the luminance control section 53 estimates the illuminance in the open state of the liquid crystal shutter by adding an illuminance corresponding to the prestored reduction value to the illuminance detected in the closed state of the liquid crystal shutter. The luminance control unit 53 controls the luminance of the first display unit 18 based on the estimated illuminance. Thus, the luminance control unit 53 may suppress the normal luminance control when the liquid crystal shutter is open and may perform different control.

The electronic device 1 configured as described above comprises a first display unit 18 or a second display unit 24, an illuminance sensor 29, a luminance control unit 53, and an operation judgement unit 52. The illuminance sensor 29 is arranged on the back side of the display surface of the display unit. The luminance control unit 53 controls, for example, the luminance of the first display unit 18 based on information related to the light detected by the illuminance sensor 29. The operation judgement unit 52 judges the reliability of the information related to the light detected by the illuminance sensor 29. The luminance control unit 53 controls, for example, the luminance of the first display unit 18 when determining that reliability is high. The luminance control unit 53 suppresses control of the luminance of the first display unit 18, for example, when determining that reliability is low. In this way, the certainty of the amount of light detected by the illuminance sensor 29 is judged, and when it is judged to be certain, the luminance of the display unit is adjusted; therefore, the appropriate luminance adjustment is made. For example, when the illuminance detected by the illuminance sensor 29 decreases, it is possible to determine whether the decrease in illuminance is a temporary phenomenon due to an accidental obstacle that appears to block the incident light of the illuminance sensor 29, or the environment of the electronic apparatus 1 has become dark; therefore, the luminance of the display surface can be adjusted more precisely.

The electronic apparatus 1 further includes a touch screen 17 disposed on a surface side of the first display unit 18 or the second display unit 24;

the operation judgement unit 52 judges whether or not the touch screen 17 is operated by the user;

the brightness control unit 53, when it is determined by the operation judgement unit 52 that the touch screen 17 is not operated by the user, determines that the reliability is high and controls the luminance of the first display unit 18; and the brightness control unit 53, when it is determined by the operation judgement unit 52 that the touch screen 17 is operated by the user, determines that the reliability is low and suppresses the luminance of the first display unit 18. In this way, it is possible to determine whether the illuminance has temporarily reduced or the environment of the electronic device has darkened by the operation of the touch screen 17 of the user. The illuminance sensor 29 can control the luminance of the first display unit 18 more precisely by judging whether or not the touch screen is operated.

The first display unit 18 of the electronic apparatus 1 includes a second display unit 24; the luminance control unit 53 determines whether or not the liquid crystal shutter of the second display unit 24 is in a transmissive state; the luminance control unit 53, when it is judged by the operation judgement unit 52 that the liquid crystal shutter is in a transparent state, judges that the reliability is high and controls the luminance of the first display unit 16; and the luminance control unit 53, when it is judged by the operation judgement unit 52 that the liquid crystal shutter is in a transparent state, judges that the reliability is low and suppresses the luminance of the first display unit 18. As a result, it is possible to detect the appropriate illuminance according to the transmittance of the liquid crystal shutter, i.e., according to the open/closed state of the liquid crystal shutter as described above. The illuminance of the environment of the electronic apparatus 1 can be detected more accurately by detecting the illuminance by the illuminance sensor 29 when the liquid crystal shutter is open.

The first display unit 18 includes an OLED positioned on the back side of the second display unit 24; the illuminance sensor 29 is located on the back side of the OLED; the luminance control unit 53, when it is judged by the operation judgement unit 52 that the liquid crystal shutter is in a transmissive state, judges that the reliability is high and controls the luminance of the first display unit 18; and the luminance control unit 53, when it is judged by the operation judgement unit 52 that the liquid crystal shutter is not in a transmissive state, judges that the reliability is low and suppresses the luminance of the first display unit 18. As a result, the luminance of the first display unit 18 is more accurately controlled because the illuminance is detected when the liquid crystal shutter is in a transmissive state.

The operation judgement unit 52 determines whether or not the user has touched the influence area corresponding to the area where the illuminance sensor 29 is arranged on the touch screen 17. The luminance control unit 53, when it is judged by the operation judgement unit 52 that the user has not touched the influence area, judges that the reliability is high and controls the luminance of the first display unit 18; and the luminance control unit 53, when it is judged by the operation judgement unit 52 that the user has touched the influence area, judges that the reliability is low and controls the luminance of the first display unit 18. As a result, it is possible to more accurately detect a situation in which the display area of the electronic apparatus 1 is covered by a user's operation (finger, hand, etc.) and the illuminance is temporarily degraded, and to reflect in the luminance adjustment of the first display unit 18.

The luminance control unit 53 maintains the luminance of the first display unit 18 at the luminance immediately before the operation of the touch screen 17 is detected, when the operation judgement unit 52 determines that the user is operating the touch screen 17. In this way, the luminance of the first display unit 18 can be maintained when the display area of the electronic apparatus 1 is covered by a user operation (e.g., finger or hand; and the illuminance is presumed to be temporarily degraded.

The first display unit 18 is an OLED. As a result, it is possible to adjust the luminance based on the illuminance more appropriately in the first display unit 18 comprising the self-emitting element.

The first display unit 18 or the second display unit 24 of the control target includes a backlight. This makes it possible to adjust the luminance of the PN liquid crystal display whose backlight is the second display unit.

The luminance control unit 53 controls the luminance of the first display unit 18 based on the information that has been corrected for variations caused by the amount of light emitted by the first display unit 18 itself, among the information detected by the illuminance sensor 29. As a result, it is possible to adjust the luminance of the first display unit 18 by suppressing the influence of the display contents of the first display unit 18.

It should be noted that the present invention is not to be limited to the above-mentioned embodiments, and that modifications, improvement, etc. within a scope that can achieve the object of the present invention are also encompassed by the present invention.

In the above-mentioned embodiments, when the illuminance in the display area of the electronic apparatus 1 is less than or equal to the threshold value of Lth, and it is determined by the operation judgement unit 52 that the user is performing a touch operation on the display area of the electronic apparatus 1, the luminance of the first display area 18 is not controlled by the luminance control unit 53; however it is not to be limited thereto. For example, when the illuminance in the display area of the electronic apparatus 1 is less than or equal to the threshold Lth, and it is determined by the operation judgement unit 52 that the user is performing a touch operation on the display area of the electronic apparatus 1, the luminance adjustment amount of the first display area 18 by the luminance control unit 53 may be lowered compared to the case where the touch screen 17 is not operated by touch. In other words, the same effect as the above-mentioned embodiment can be obtained even by suppressing (stopping or lowering) the adjustment of luminance.

Also, in the above-mentioned embodiment, the electronic apparatus 1 is provided with a first display unit 18 and a second display unit 24; however, it is not to be limited thereto, and the electronic apparatus 1 may be provided with only the first display unit 18 or only the second display unit 24. In this case, the position of the illuminance sensor 29 may be located on the back face of the display unit. The illuminance sensor 29 may be provided between the first display unit 18 and the second display unit 24 in the configuration including the first display unit 18 and the second display unit 24. Also, in the above-mentioned embodiment, the CPU 11 of the electronic apparatus 1 is composed of a first CPU 11A and a second CPU 11B; however, it is not to be limited thereto, and the CPU 11 may be a single CPU that has both the functions of the first CPU 11A and the functions of the second CPU 11B.

In the above-described embodiments, explanations are given with the example of the electronic apparatus 1 to which the present invention is applied being a digital camera watch-type device (a smart watch or the like); however, the present invention is not particularly limited thereto. For example, the present invention may be applied to electronic devices in general having a luminance adjustment function. More specifically, for example, the present invention can be applied to a notebook-type personal computer, a printer, a television receiver, a video camera, a portable navigation device, a mobile phone, a smartphone, a portable game console, and the like.

The processing sequence described above can be executed by hardware, and can also be executed by software. In other words, the functional configuration of FIG. 4 is merely an illustrative example, and the present invention is not particularly limited thereto, hore specifically, the types of functional blocks employed to realize the above-described functions are not particularly limited to the examples shown in FIG. 4, so long as the electronic apparatus 1 can be provided with the functions enabling the aforementioned processing sequence to be executed in its entirety. A single functional block may be configured by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field Programmable Gate Array).

In the case of having the series of processing executed by software, the program constituting this software is installed from a network or recording medium to a computer or the like. The computer may be s computer equipped with dedicated hardware. In addition, the computer may be a computer capable of executing various functions, e.g., a general purpose personal computer, by installing various programs.

The storage medium containing such a program can not only be constituted by the removable medium 100 of FIG. 2 distributed separately from the device main body for supplying the program to a user, but also can be constituted by a storage medium or the like suppLied to the user in a state incorporated in the device main body in advance. The removable medium 41 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 2 in which the program is recorded or a hard disk included in the storage section 14 of FIG. 2.

It should be noted that, in the present specification, the steps defining the program recorded in the storage medium include not only the processing executed in a time series following this order, but also processing executed in parallel or individually, which is not necessarily executed in a time series. Moreover, the process of Step S14 of the second embodiment need not necessarily performed, and may be omitted.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

The invention claimed is:

1. An electronic apparatus comprising:
   a display unit;
   a light detecting unit disposed on a back side of a display surface of the display unit; and
   a processing device configured to perform operations comprising:
      controlling a luminance of the display unit based on information related to light detected by the light detection unit; and
      judging a reliability of the information related to light detected by the light detecting unit,
   wherein:
   the processing device controls the luminance of the display unit when it is judged that the reliability is high,
   the processing device suppresses control of the luminance of the display unit when it is judged that the reliability is low,
   the display unit includes a liquid crystal display device,
   the processing device judges whether or not a liquid crystal shutter of the liquid crystal display device is in a transmissive state,
   the processing device judges that the reliability is high when it is judged that the liquid crystal shutter is in the transmissive state, and controls the luminance of the display unit, and
   the processing device judges that the reliability is low when it is judged that the liquid crystal shutter is not in the transmissive state, and suppresses the control of the luminance of the display unit.

2. The electronic apparatus according to claim 1, further comprising a touch screen unit disposed on a surface side of the display unit,
   wherein:
   the processing device judges whether or not the touch screen unit is operated by a user,
   the processing device judges that the reliability is high when it is judged that the touch screen unit is not operated by the user, and controls the luminance of the display unit, and
   the processing device judges that the reliability is low when it is judged that the touch screen unit is operated by the user, and suppresses the control of the luminance of the display unit.

3. The electronic apparatus according to claim 1, wherein:
   the display unit includes an OLED placed on a back side of the liquid crystal display device,
   the light detecting unit is placed on a back side of the OLED,
   the processing device judges that the reliability is high when it is judged that the liquid crystal shutter is in the transmissive state, and controls a luminance of the OLED, and
   the processing device judges that the reliability is low when it is judged that the liquid crystal shutter is not in the transmissive state, and suppresses control of the luminance of the OLED.

4. The electronic apparatus according to claim 1, further comprising a touch screen unit disposed on a surface side of the display unit,
   wherein:
   the processing device judges whether or not a user touches an influence area of the touch screen unit, the influence area corresponding to an area where the light detecting unit is disposed,
   the processing device judges that the reliability is high when it is judged that the user does not touch the influence area, and controls the luminance of the display unit, and
   the processing device judges that the reliability is low when it is judged that the user touches the influence area, and suppresses the control of the luminance of the display unit.

5. The electronic apparatus according to claim 1, wherein the display unit includes an OLED.

6. The electronic apparatus according to claim 1, wherein the display unit includes a backlight.

7. The electronic apparatus according to claim 1, wherein the processing device controls the luminance of the display unit based on information which is corrected with regard to variations caused by an amount of light emitted by the display unit itself.

8. An electronic apparatus comprising:
   a display unit;
   a light detecting unit disposed on a back side of a display surface of the display unit; and
   a processing device configured to perform operations comprising:
      controlling a luminance of the display unit based on information related to light detected by the light detection unit; and
      judging a reliability of the information related to light detected by the light detecting unit,
   wherein:
   the processing device controls the luminance of the display unit when it is judged that the reliability is high,
   the processing device suppresses control of the luminance of the display unit when it is judged that the reliability is low,
   the processing device judges whether or not a user touches an influence area of the touch screen unit, the influence area corresponding to an area where the light detecting unit is disposed, the processing device judges that the reliability is high when it is judged that the user does not touch the influence area, and controls the luminance of the display unit, the processing device judges that the reliability is low when it is judged that the user touches the influence area, and suppresses the control of the luminance of the display unit, and the processing device maintains the luminance of the display unit at a luminance immediately before operation of the touch screen is detected, when it is judged that the reliability is at least a predetermined value.

9. A luminance control method performed by an electronic apparatus comprising a display unit and a light detection unit disposed on a back side of a display surface of the display unit, the method comprising:

judging a reliability of information related to light detected by the light detection unit;

judging whether the reliability is high or low, and determining control of a luminance of the display unit based on the judgment of whether the reliability is high or low, such that the luminance of the display unit is controlled when it is judged that the reliability is high, and control of the luminance of the display unit is suppressed when it is judged that the reliability is low, wherein:

the display unit includes a liquid crystal display device, the judging the reliability of the information comprises judging whether or not a liquid crystal shutter of the liquid crystal display device is in a transmissive state, and the judging whether the reliability is high or low comprises judging that the reliability is high when it is judged that the liquid crystal shutter is in the transmissive state, and judging that the reliability is low when it is judged that the liquid crystal shutter is not in the transmissive state.

10. The luminance control method according to claim 9, wherein:

the electronic apparatus further comprises a touch screen unit disposed on a surface side of the display unit, the judging the reliability of the information comprises judging whether or not the touch screen unit is operated by a user, and the judging whether the reliability is high or low comprises judging that the reliability is high when it is judged that the touch screen unit is not operated by the user, and judging that the reliability is low when it is judged that the touch screen unit is operated by the user.

11. The luminance control method according to claim 9, wherein:

the display unit includes an OLED disposed on a back side of the liquid crystal display device, the light detection unit is disposed on a back side of the OLED, and the controlling the luminance of the display unit comprises controlling a luminance of the OLED.

12. The luminance control method according to claim 9, wherein:

a touch screen unit is disposed on a surface side of the display unit, the judging the reliability of the information comprises judging whether or not a user touches an influence area of the touch screen unit, the influence area corresponding to an area where the light detection unit is disposed, and the judging whether the reliability is high or low comprises judging that the reliability is high when it is judged that the user does not touch the influence area, and judging that the reliability is low when it is judged that the user touches the influence area.

13. The luminance control method according to claim 12, further comprising:

judging whether or not the reliability is more than a predetermined value; and in response to judging that the reliability is more than the predetermined value, maintaining the luminance of the display unit at a luminance immediately before operation of the touch screen is detected.

14. A non-transitory computer-readable storage medium storing a program executable by a computer which controls an electronic apparatus having a display unit and a light detection unit disposed on a back side of a display surface of the display unit, the program being executable by the computer to control the electronic apparatus to perform operations including:

judging a reliability of information related to light detected by the light detection unit;

controlling a luminance of the display unit when it is judged that the reliability is high; and suppressing control of the luminance of the display unit when it is judged that the reliability is low, wherein:

the display unit includes a liquid crystal display device, the judging the reliability of the information comprises judging whether or not a liquid crystal shutter of the liquid crystal display device is in a transmissive state, when it is judged that the liquid crystal shutter is in the transmissive state, the reliability is judged to be high and the luminance of the display unit is controlled, and when it is judged that the liquid crystal shutter is not in the transmissive state, the reliability is judged to be low, and the control of the luminance of the display unit is suppressed.

* * * * *